United States Patent Office 3,539,584
Patented Nov. 10, 1970

3,539,584
5-SUBSTITUTED-2,1-BENZISOTHIAZOLINES
John T. Suh and Claude I. Judd, Mequon, and Joseph A. Skorcz, Milwaukee, Wis., assignors to Colgate-Palmolive Company, New York, N.Y., a corporation of Delaware
No Drawing. Continuation-in-part of application Ser. No. 585,765, Oct. 11, 1966. This application Nov. 14, 1967, Ser. No. 683,009
Int. Cl. C07d 91/44
U.S. Cl. 260—304          8 Claims

ABSTRACT OF THE DISCLOSURE

The compounds are 5-substituted derivatives of 2,1-benzisothiazoline-2,2-dioxides which are useful in the preparation of wood preservatives, moth proofing agents and pickling inhibitors and as pharmaceutical agents, particularly antihypertensive agents and central nervous system stimulants. Compounds disclosed include 1,3-dimethyl-5-amino-2,1-benzisothiazoline-2,2-dioxide, 1,3-dimethyl-5-methanesulfonamido-2,1-benzisothiazoline - 2,2-dioxide and 1,3-dimethyl-5-acetamido-2,1-benzisothiazoline-2,2-dioxide.

---

The present application is a continuation-in-part of our copending application Ser. No. 585,765, filed Oct. 11, 1966, now abandoned.

SUMMARY OF THE INVENTION

The present invention relates to novel 5-substituted derivatives of 2,1-benzisothiazoline-2,2-dioxides, methods of preparing such compounds and compositions containing them.

DETAILED DESCRIPTION

The novel compounds of the present invention may be represented by the following formula

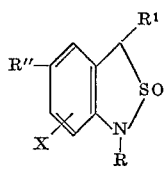

in which X is selected from hydrogen, lower alkyl of 1 to 4 carbon atoms such as methyl, ethyl or propyl, lower alkoxy such as methoxy, ethoxy and propoxy halo and trifluoromethyl; R is selected from a lower alkyl of 1 to 4 carbon atoms, a cycloalkyl of 3 to 7 carbon atoms such as cyclopropyl, cyclopentyl or cyclohexyl, a cycloalkyl-lower alkyl in which the cycloalkyl has 3 to 7 carbon atoms such as cyclopropyl-ethyl, cyclopentyl-methyl and cyclohexyl-methyl, a nuclear substituted phenyl, particularly a lower alkoxy-substituted phenyl such as methoxyphenyl, or an aralkyl of 7 to 11 carbon atoms, particularly a phenyl-lower alkyl such as benzyl, phenethyl, phenylbutyl or phenylisopropyl; R' is selected from R or hydrogen and R" is nitro, —NR'$_2$, R'CONR', R'SO$_2$NR', R'CO, RCH(OH), R'$_2$C(halo)CO, Am(CR'$_2$)$_n$CO, Am(CR'$_2$)$_n$CH(OH) and Am(CR'$_2$)$_n$CH$_2$, wherein $n$ is 1 to 5 and Am is

in which R' is R or hydrogen and groups in which the R' and R' are joined together to form amino groups in which the nitrogen is part of a cyclic group such as morpholino, pyrrolidino, piperidino, 1,2,3,4-tetrahydroisoquinolino, 1,2,3,4-tetrahydroquinolino, a 4-lower alkyl-1-piperazino such as 4-methyl-1-piperazino, 3-hydroxypiperidino and 4-hydroxypiperidino.

A convenient starting material for the preparation of the compounds of the present invention are the corresponding sultams which may be represented by the following formula

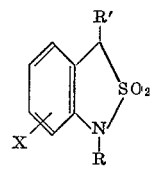

in which R and R' are as previously described and X is other than halogen.

The above sultams may be conveniently prepared by employing a haloaniline such as o-chloroaniline or m-bromoaniline, or an N-substituted haloaniline such as N-phenyl-o-chloroaniline or N-p-methoxyphenyl-o-bromoaniline as the basic starting material.

If an unsubstituted haloaniline is employed it is first treated with methanesulfonyl chloride to form a halomethane-sulfonanilide; the sulfonanilide is then treated with an alkyl ester such as dimethylsulfate and a base such as potassium hydroxide, to form an N-substituted-halomethanesulfonanilide. The thus obtained sulfonanilide is then treated with a non-participating strong base, for example, an alkali amide such as sodium amide in an inert reaction medium such as liquid ammonia, anhydrous ether, benzene or the like, to effect ring closure.

The described process may be diagrammed as follows:

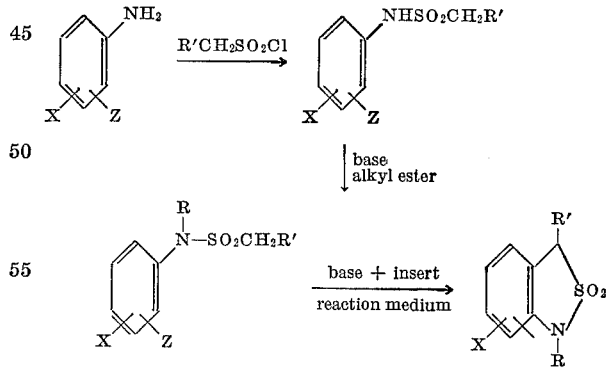

wherein X is hydrogen, lower alkyl, alkoxy or trifluoromethyl, Z is a reactive halogen and R and R' are groups which do not interfere with or partake in the reaction.

If an N-substituted haloaniline is employed as the starting material, it is first treated with alkylsulfonyl chloride to form the alkylsulfonanilide derivative which may be treated directly with a suitable base in an inert reaction medium to effect ring closure.

This process may be diagrammed as follows:

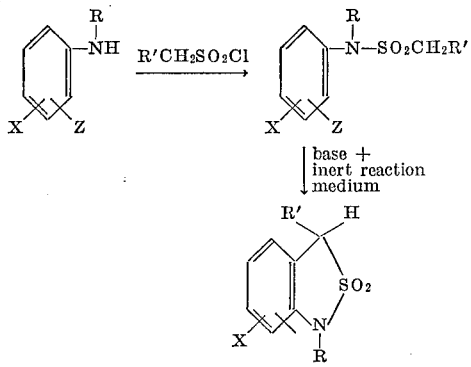

wherein Z is chloro or bromo, X is hydrogen, lower alkyl, alkoxy or trifluoromethyl, and R and R' are groups which do not interfere with or partake in the reaction.

Those compounds in which R" is amino, sulfamoyl and $NR'_2$ may be conveniently prepared by first forming the nitro substituted compound and then reducing that compound to the amino derivative. The primary amine may be converted employing conventional techniques to a wide variety of secondary and tertiary amines and amine derivatives.

Among the amine derivatives which can be prepared are the sulfamoyl, acyl and diacyl derivatives. The sulfamoyl type derivatives may be prepared by treating the primary amine with an alkylsulfonyl halide such as methanesulfonyl chloride. The acyl derivatives of the amines may be prepared by treating the primary amine with an acyl chloride or bromide, or if the diacyl derivative is preferred, with acetic anhydride.

The above described processes may be illustrated, in part, as follows:

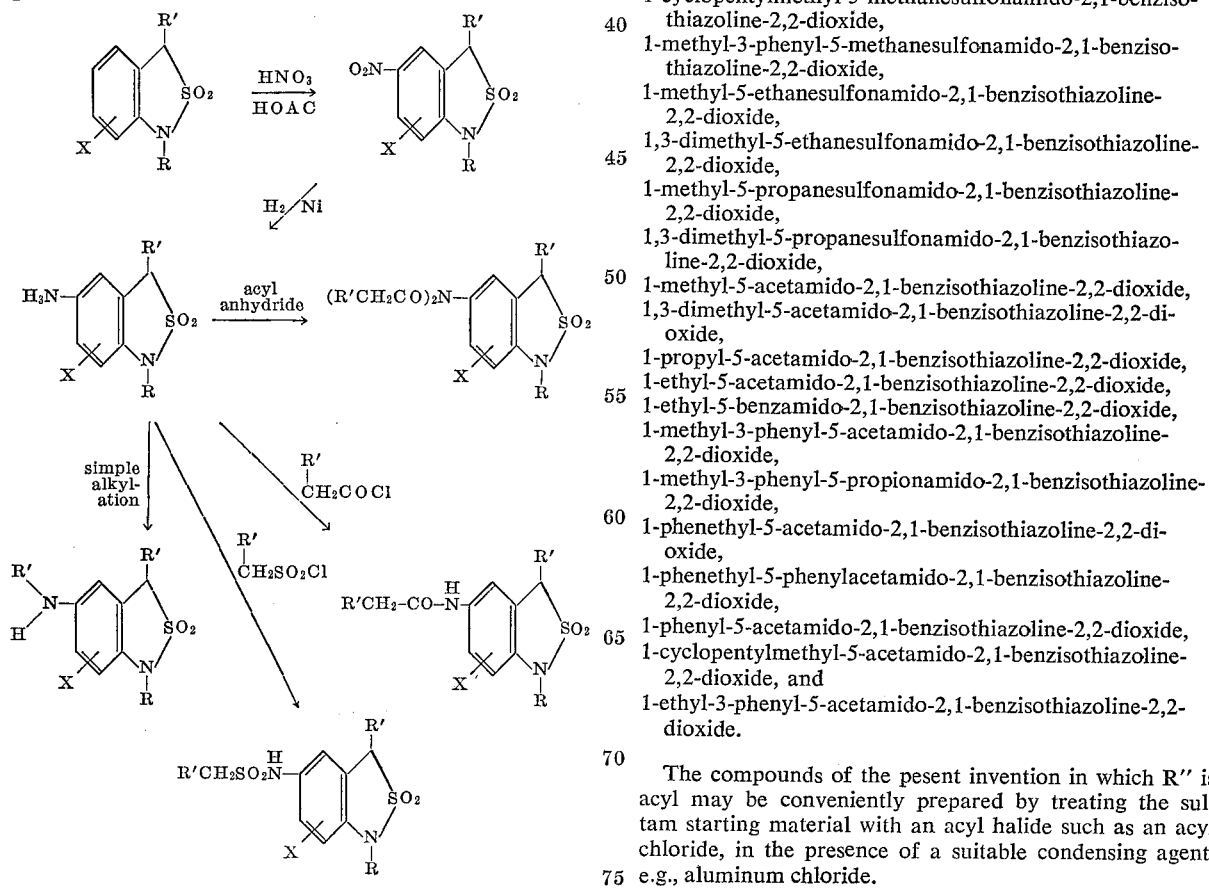

in which R' may be the same or different, X is other than halogen, and all other symbols are as described and do not partake in or interfere in the reaction.

Representative of the compounds which can be prepared by the described processes are 1-methyl-5-nitro-2,1-benzisothiazoline-2,2-dioxide,
1-ethyl-5-nitro-2,1-benzisothiazoline-2,2-dioxide,
1,3-dimethyl-5-nitro-2,1-benzisothiazoline-2,2-dioxide,
1-phenethyl-5-nitro-2,1-benzisothiazoline-2,2-dioxide,
1-propyl-5-nitro-2,1-benzisothiazoline-2,2-dioxide,
1-phenyl-5-nitro-2,1-benzisothiazoline-2,2-dioxide,
1-cyclopentylmethyl-5-nitro-2,1-benzisothiazoline-2,2-dioxide,
1-ethyl-3-phenyl-5-nitro-2,1-benzisothiazoline-2,2-dioxide,
1-methyl-5-amino-2,1-benzisothiazoline-2,2-dioxide,
1-ethyl-5-amino-2,1-benzisothiazoline-2,2-dioxide,
1-propyl-5-amino-2,1-benzisothiazoline-2,2-dioxide,
1,3-dimethyl-5-amino-2,1-benzisothiazoline-2,2-dioxide,
1-phenethyl-5-amino-2,1-benzisothiozoline-2,2-dioxide,
1-phenyl-5-amino-2,1-benzisothiazoline-2,2-dioxide,
1-cyclopentylmethyl-5-amino-2,1-benzisothiazoline-2,2-dioxide,
1-ethyl-3-phenyl-5-amino-2,1-benzisothiazoline-2,2-dioxide,
1-methyl-5-methanesulfonamido-2,1-benzisothiazoline-2,2-dioxide,
1-ethyl-5-methanesulfonamido-2,1-benzisothiazoline-2,2-dioxide,
1-propyl-5-methanesulfonamido-2,1-benzisothiazoline-2,2-dioxide,
1,3-dimethyl-5-methanesulfonamido-2,1-benzisothiazoline-2,2-dioxide,
1-phenethyl-5-methanesulfonamide-2,1-benzisothiazoline-2,2-dioxide,
1-phenyl-5-methanesulfonamido-2,1-benzisothiazoline-2,2-dioxide,
1-cyclopentylmethyl-5-methanesulfonamido-2,1-benzisothiazoline-2,2-dioxide,
1-methyl-3-phenyl-5-methanesulfonamido-2,1-benzisothiazoline-2,2-dioxide,
1-methyl-5-ethanesulfonamido-2,1-benzisothiazoline-2,2-dioxide,
1,3-dimethyl-5-ethanesulfonamido-2,1-benzisothiazoline-2,2-dioxide,
1-methyl-5-propanesulfonamido-2,1-benzisothiazoline-2,2-dioxide,
1,3-dimethyl-5-propanesulfonamido-2,1-benzisothiazoline-2,2-dioxide,
1-methyl-5-acetamido-2,1-benzisothiazoline-2,2-dioxide,
1,3-dimethyl-5-acetamido-2,1-benzisothiazoline-2,2-dioxide,
1-propyl-5-acetamido-2,1-benzisothiazoline-2,2-dioxide,
1-ethyl-5-acetamido-2,1-benzisothiazoline-2,2-dioxide,
1-ethyl-5-benzamido-2,1-benzisothiazoline-2,2-dioxide,
1-methyl-3-phenyl-5-acetamido-2,1-benzisothiazoline-2,2-dioxide,
1-methyl-3-phenyl-5-propionamido-2,1-benzisothiazoline-2,2-dioxide,
1-phenethyl-5-acetamido-2,1-benzisothiazoline-2,2-dioxide,
1-phenethyl-5-phenylacetamido-2,1-benzisothiazoline-2,2-dioxide,
1-phenyl-5-acetamido-2,1-benzisothiazoline-2,2-dioxide,
1-cyclopentylmethyl-5-acetamido-2,1-benzisothiazoline-2,2-dioxide, and
1-ethyl-3-phenyl-5-acetamido-2,1-benzisothiazoline-2,2-dioxide.

The compounds of the pesent invention in which R" is acyl may be conveniently prepared by treating the sultam starting material with an acyl halide such as an acyl chloride, in the presence of a suitable condensing agent, e.g., aluminum chloride.

This reaction may be diagrammed as follows:

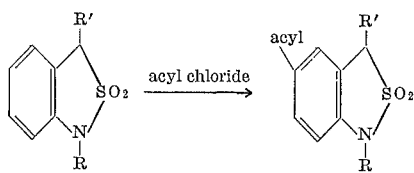

in which all symbols are as described and do not partake or interfere with the reaction.

Representative of the compounds which may be prepared by the proper choice of an acyl halide are the following:

1-methyl-5-acetyl-2,1-benzisothiazoline-2,2-dioxide,
1-methyl-5-benzoyl-2,1-benzisothiazoline-2,2-dioxide,
1,3-dimethyl-5-acetyl-2,1-benzisothiazoline-2,2-dioxide,
1,3-dimethyl-5-propionyl-2,1-benzisothiazoline-2,2-dioxide,
1-ethyl-5-acetyl-2,1-benzisothiazoline-2,2-dioxide,
1-propyl-5-acetyl-2,1-benzisothiazoline-2,2-dioxide,
1-propyl-5-phenylacetyl-2,1-benzisothiazoline-2,2-dioxide,
1-methyl-3-phenyl-5-acetyl-2,1-benzisothiazoline-2,2-dioxide,
1-phenethyl-5-acetyl-2,1-benzisothiazoline-2,2-dioxide, and
1-cyclopentylmethyl-5-acetyl-2,1-benzisothiazoline-2,2-dioxide.

The compounds of the present invention in which R″ is Am(CR′$_2$)$_n$CO, Am(CR′$_2$)$_n$CHOH, or Am(CR′$_2$)$_n$CH$_2$ may be prepared by treating the sultam starting material with a haloacyl halide, such as bromoacetyl bromide, to form the corresponding haloacyl derivative which can be in turn treated with a variety of amines to form acylamines which can be in turn reduced to form aminohydroxy alkyl derivatives.

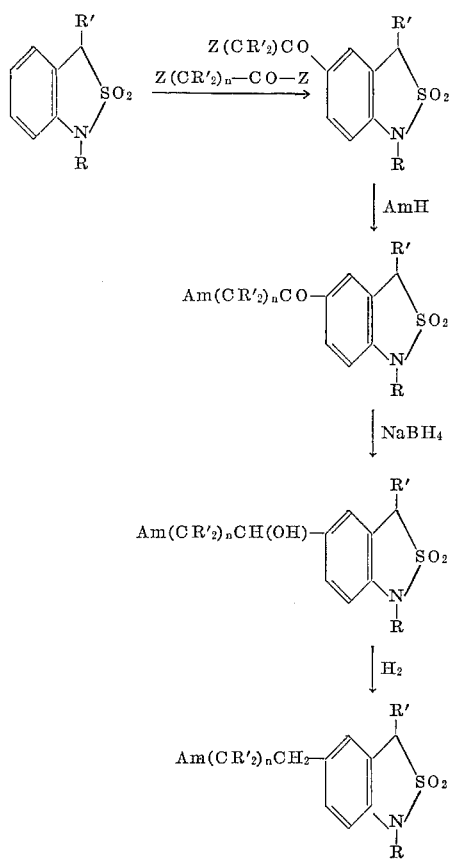

wherein Z is a halo such as chloro or bromo, and all other symbols are as described and represent groups which do not partake in or interfere with the reaction.

Representative of the haloacyl halides which can be employed in the above reaction are the following:
Bromoacetyl bromide,
Chloroacetyl chloride,
Bromopropionyl bromide,
Chloropropionyl chloride, and
Bromobutyryl bromide.

Representative of the amines that may be employed are the following:
1-dimethylamino-3-propylamine,
1-dimethylamino-2-ethylamine,
Dimethylamine,
Methylamine,
Ethylamine,
Benzylamine,
N-methyl-benzylamine,
Morpholine,
N-methyl-piperazine,
Piperidine,
Ammonia, and
Isopropylamine.

Representative of the compounds that may be prepared by the above process are the following:
1-methyl-5-bromoacetyl-2,1-benzisothiazoline-2,2-dioxide,
1,3-dimethyl-5-bromoacetyl-2,1-benzisothiazoline-2,2-dioxide,
1-methyl-5-isopropylaminoacetyl-2,1-benzisothiazoline-2,2-dioxide,
1-methyl-5-methylbenzylaminoacetyl-2,1-benzisothiazoline-2,2-dioxide,
1-methyl-5-methylaminoacetyl-2,1-benzisothiazoline-2,2-dioxide,
1,3-dimethyl-5-isopropylaminoacetyl-2,1-benzisothiazoline-2,2-dioxide,
1-methyl-5-(2′-isopropylamino-1′-hydroxyethyl)-2,1-benzisothiazoline-2,2-dioxide,
1,3-dimethyl-5-(2′-isopropylamino-1′-hydroxyethyl)-2,1-benzisothiazoline-2,2-dioxide,
1-methyl-5-(2′-isopropylamino-1′-hydroxyethyl)-2,1-benzisothiazoline-2,2-dioxide,
1,3-dimethyl-5-(2′-isopropylamino-1′-hydroxyethyl)-2,1-benzisothiazoline-2,2-dioxide,
1-phenyl-5-(2′-isopropylamino-1′-hydroxyethyl)-2,1-benzisothiazoline-2,2-dioxide,
1-cyclopentylmethyl-5-(2′-isopropylamino-1′-hydroxyethyl)-2,1-benzisothiazoline-2,2-dioxide,
1-phenethyl-5-(2′-isopropylamino-1′-hydroxyethyl)-2,1-benzisothiazoline-2,2-dioxide,
1-methyl-5-(2′-methylamino-1′-hydroxyethyl)-2,1-benzisothiazoline-2,2-dioxide,
1-methyl-5-(2′-methylbenzylamino-1′-hydroxyethyl)-2,1-benzisothiazoline-2,2-dioxide,
1,3-dimethyl-5-(2′-methylamino-1′-hydroxyethyl)-2,1-benzisothiazoline-2,2-dioxide,
1,3-dimethyl-5-(2′-methylaminoethyl)-2,1-benzisothiazoline-2,2-dioxide,
1,3-dimethyl-5-(2′-isopropylaminoethyl)-2,1-benzisothiazoline-2,2-dioxide,
1-methyl-5-(N-methylpiperazinoacetyl)-2,1-benzisothiazoline-2,2-dioxide,
1,3-dimethyl-5-(N-methylpiperazinoacetyl)-2,1-benzisothiazoline-2,2-dioxide,
1-methyl-5-(2′-N-methylpiperazino-1′-hydroxyethyl)-2,1-benzisothiazoline-2,2-dioxide,
1,3-dimethyl-5-(2′-N-methylpiperazino-1′-hydroxyethyl)-2,1-benzisothiazoline-2,2-dioxide,
1-methyl-5-(2′-N-methylpiperazinoethyl)-2,1-benzisothiazoline-2,2-dioxide, and
1,3-dimethyl-5-(2′-N-methylpiperazinoethyl)-2,1-benzisothiazoline-2,2-dioxide.

The compounds in which X is other than hydrogen are preferably prepared by using conventional chlorination, and the like, techniques to place the ring substituent into the 1,5-substituted - 2,1 - benzisothiazoline-2,2-dioxide. For example, chlorine may be inserted into the 6 position by treating a 1,5-substituted-2,1-benzisothiazoline-2,2-dioxide with N-chlorosuccinamide in dimethylformamide.

Acid addition salts of the compounds of the present invention may be conveniently prepared by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds with a suitable alkylating agent such as dimethyl sulfate, or an alkyl halide such as methyl chloride, methyl iodide or ethyl bromide.

The thiocyanic acid addition salts of the compounds when condensed with formaldehyde form resinous materials useful as pickling agents according to U.S. Pats. 2,425,320 and 2,606,155. The compounds also form fluosilicic acid addition salts which are useful as moth proofing agents according to U.S. Pats. 1,915,334 and 2,075,359.

The novel compounds of the invention are pharmacologically active. For example, the compounds 1,3-dimethyl-5-amino-2,1 - benzisothiazoline-2,2-dioxide hydrochloride, 1,3-dimethyl-5-methanesulfonamido 2,1-benzisothiazoline-2,2-dioxide, 1,3-dimethyl - 5-acetamido-2,1-benzisothiazoline-2,2-dioxide, 1,methyl-5-(2'-N-methylpiperazino-1'-hydroxyethyl) - 2,1-benzisothiazoline - 2,2-dioxide dihydrochloride and 1-methyl - 5-(2'-methylamino-1'-hydroxyethyl)-2,1-benzisothiazoline-2,2-dioxide, when evaluated in mouse behavioral studies at intraperitoneal doses of 3 to 100 mg./kg. of body weight were found to produce central nervous system stimulation as evidenced by an elevation of reactivity to stimuli, vocalization, pain response, pinnea hyperflexia and increased startle response. The mouse behavioral studies also indicated at such doses the compounds were relatively safe and possessed $LD_{50}$ values in excess of 200 mg./kg. The behavorial studies were conducted essentially in accordance with the procedure outlined by S. Irwin in "Animal and Clinical Pharmacologic Techniques in Drug Evaluation," J. H. Nodine and P. E. Siegler, Ed. Year Book Medical Publishers, Inc. 1964.

The compounds are preferably combined with one or more suitable pharmaceutical diluents and formed into unit dosage forms such as tablets, capsules or solutions. Such dosage forms provide suitable means for oral and parenteral administration.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily.

The following examples are presented to illustrate this invention.

EXAMPLE 1

1-methyl-5-nitro-2,1-benzisothiazoline-2,2-dioxide

A well stirred solution of 1-methyl-2,1-benzisothiazoline-2,2-dioxide (2.7 g., 0.015 mole) in 20 ml. of glacial acetic acid is cooled to 15° and treated dropwise with concentrated nitric acid. After 25 min., and the addition of 7 ml. of acid, the light amber solution begins to darken, the temperature rises to 35°, and a solid settles from solution. The mixture is stirred for an additional 30 min. and then poured into 300 ml. of ice water. The gray precipitate is filtered, washed with water, and dried. Recrystallization of the product from chloroform, including treatment with activated charcoal, affords 1-methyl-5-nitro-2,1-benzisothiazoline-2,2-dioxide in the form of a pale tan, crystalline powder which melts at 213–214.5°.

Analysis.—Calc'd for $C_8H_8N_2O_4S$ (percent): C, 42.10; H, 3.54; N, 12.28. Found (percent): C, 42.05; H, 3.67; N, 12.50.

EXAMPLE 2

1,3-dimethyl-5-nitro-2,1-benzisothiazoline-2,2-dioxide

A well-stirred solution of 1,3-dimethyl-2,1-benzisothiazoline-2,2-dioxide (19.7 g., 0.1 mole) in 100 ml. of glacial acetic acid is cooled to 11° and treated dropwise with concentrated $HNO_3$. After 40 minutes and the addition of 65 ml. of acid, the solution rapidly darkens and the temperature rises to 38°. Stirring and cooling are continued for 20 minutes, then the solution is poured into 1.5 liters of ice water. The resulting solid is taken up in chloroform, which was washed with saturated $NaHCO_3$ solution, dried ($K_2CO_3$), concentrated, heated with activated charcoal, filtered and diluted with petroleum ether. The 1,3-dimethyl-5-nitro-2,1-benzisothiazoline-2,2-dioxide which is obtained in the form of tan crystals melts at 146–149°.

Analysis.—Calc'd for $C_9H_{10}N_2O_4S$ (percent): C, 44.62; H, 4.16; N, 11.58. Found (percent): C, 44.80; H, 4.38; N, 11.25.

EXAMPLE 3

1,3-dimethyl-5-amino-2,1-benzisothiazoline-2,2-dioxide hydrochloride

The nitro compound of Example 2 (2.4 g., 0.01 mole) is treated with hydrogen at 45 p.s.i. in the presence of 10% palladium on carbon. After 1 hr., the catalyst is filtered and the filtrate evaporated to dryness. Treatment of the residual oil in ethanol-ether with dry HCl affords 1,3-dimethyl-5-amino - 2,1-benzisothiazoline - 2,2-dioxide hydrochloride in the form of a tan powder, M.P. 204–206°.

Analysis.—Calc'd for $C_9H_{13}ClN_2O_2S$ (percent): C, 43.47; H, 5.27; N, 11.26. Found (percent): C, 43.50; H, 5.46; N, 11.32.

EXAMPLE 4

1,3-dimethyl-5-methanesulfonamido-2,1-benzisothiazoline-2,2-dioxide

A solution of the compound of Example 3 (2.1 g., 0.01 mole), as the free base, and triethylamine (1 g., 0.01 mole) in 100 ml. of dry benzene is treated dropwise under nitrogen with a solution of methanesulfonyl chloride (1.26 g., 0.011 mole) in 20 ml. of benzene. The hazy solution is stirred at 25° for 3 hrs., then refluxed for 18 hrs. Water is added, and the benzene layer diluted with ethyl acetate, washed with 5% HCl and saturated brine solution, dried ($Na_2SO_4$), and evaporated. The residual semi-solid is recrystallized from chloroform-petroleum ether to yield 1,3-dimethyl-5-methanesulfonamido-2,1 - benzisothiazoline-2, 2-dioxide in the form of off-white rhombs, M.P. 139–141°.

Analysis.—Calc'd for $C_{10}H_{14}N_2O_4S$ percent): C, 41.36; H, 4.86; N, 9.65. Found (percent): C, 41.31; H, 4.80; N, 9.53.

EXAMPLE 5

1,3-dimethyl-5-acetamido-2,1-benzisothiazoline-2,2-dioxide

A solution of the compound of Example 3 (2.1 g., 0.01 mole), as the free base, and 1 g. (0.01 mole) of triethylamine in 100 ml. of dry benzene is treated dropwise under nitrogen with 0.86 g. (0.011 mole) of acetyl chloride. The mixture is stirred at 25° for 16 hrs., refluxed for an additional hour, and evaporated. The residual solid is washed with water and dried, M.P. 139–143°. Recrystallization from chloroform-petroleum ether affords 1,3 - dimethyl-5-acetamido-2,1-benzisothiazoline-2,2-dioxide in the form of off-white granules with a M.P. of 141–142.5°.

Analysis.—Calcd. for $C_{11}H_{14}N_2O_3S$ (percent): C, 51.98; H, 5.55; N, 11.02. Found (percent): C, 51.87; H, 5.81; N, 10.95.

EXAMPLE 6

1-methyl-5-acetyl-2,1-benzisothiazoline-2,2-dioxide

A solution of 1-methyl-2,1-benzisothiazoline-2,2-dioxide (27 g., 0.15 mole) and 5 ml. of 85% H₃PO₄ in 125 ml. of acetic anhydride is stirred at an oil bath temperature of 100° for 1 hr. The solution is poured into 2.5 liters of ice water, and the excess anhydride decomposed with solid $Na_2CO_3$. The dark gum is taken up in chloroform, which was washed with saturated $NaHCO_3$ solution and with saturated brine, dried ($K_2CO_3$, $Na_2SO_4$), and concentrated. Activated charcoal is added, the mixture heated several minutes, then filtered, and the filtrate evaporated to dryness. The residual semi-solid is eluted from 500 g. of silica gel with benzene-ether (4:1) to afford the desired 1-methyl-5-acetyl-2,1-benzisothiazoline-2,2-dioxide. Recrystallization of the product from chloroform-petroleum ether gives pale amber needles, M.P. 139.5–143°.

*Analysis.*—Calcd. for $C_{10}H_{11}NO_3S$ (percent): C, 53.32; H, 4.92; N, 6.22; S, 14.23. Found (percent): C, 53.09; H, 4.89; N, 6.37; S, 14.33.

EXAMPLE 7

1-methyl-5-bromoacetyl-2,1-benzisothiazoline-2,2-dioxide

To a stirred mixture of 1-methyl-2,1-benzisothiazoline-2,2-dioxide (16.5 g., 0.9 mole) and 32.7 g. (0.162 mole) of bromoacetyl bromide in 70 ml. of carbon disulfide is added portionwise 36 g. (0.27 mole) of aluminum chloride. The resulting reddish-brown mass is stirred for 30 minutes and allowed to stand at room temperature overnight. The gummy material is poured into 400 ml. of ice water containing 7 ml. of concentrated HCl. The resulting yellow solid is filtered, washed with water, and dried. Recrystallization from chloroform-benzene-petroleum ether provides 1-methyl-5-bromoacetyl-2,1-benzisothiazoline-2,2-dioxide as a yellow powder, M.P. 146–147.5°.

*Analysis.*—Calcd. for $C_{10}H_{10}BrNO_3S$ (percent): C, 39.49; H, 3.31; N, 4.61. Found (percent): C, 39.83; H, 3.40; N, 4.84.

EXAMPLE 8

1-methyl-5-isopropylaminoacetyl-2,1-benzisothiazoline-2,2-dioxide hydrobromide

To a cooled solution of isopropylamine (5.9 g., 0.1 mole) in 60 ml. of tetrahydrofuran is added with stirring 7.6 g. (0.025 mole) of the bromoketone of Example 7. The ice bath is removed, and the mixture stirred at room temperature for 30 minutes and then evaporated to dryness. Acetone (50 ml.) is added to the residue, and the resulting solid filtered, washed with ether, and dried. Recrystallization from aqueous methanol-ether affords 1-methyl-5-isopropylaminoacetyl-2,1 - benzisothiazoline-2,2-dioxide hydrobromide in the form of small, pale amber flakes, M.P. 250–251°.

*Analysis.*—Calcd. for $C_{13}H_{19}BrN_2O_3S$ (percent): C, 42.97; H, 5.28; N, 7.71. Found (percent): C, 43.25; H, 5.42; N, 7.89.

EXAMPLE 9

1-methyl-5-(2'-isopropylamino-1-hydroxyethyl)-2,1-benzisothiazoline-2,2-dioxide hydrochloride To a cooled suspension of the hydrobromide of Example 8 (3.6 g., 0.01 mole) in 50 ml. of methanol is added 0.38 g. (0.01 mole) of sodium borohydride over a 15 minute period. The salt dissolves during the addition, and the resulting solution is stirred at 25° for 2 hours, acidified with 4 N HCl, and evaporated to dryness. The semi-solid residue is covered with ether (100 ml.) and treated with 50 ml. of 5% NaOH. The organic layer is separated, dried ($K_2CO_3$) and treated with dry HCl. The gummy solid which forms is recrystallized twice to give 1-methyl-5-(2'-isopropylamino-1-hydroxyethyl)-2,1-benzisothiazoline - 2,2 - dioxide hydrochloride in the form of a light tan, crystalline powder, M.P. 164–166°.

*Analysis.*—Calcd. for $C_{13}H_{21}ClN_2O_2S$ (percent): C, 48.66; H, 6.59; N, 8.73. Found (percent): C, 48.86; H, 6.60; N, 8.56.

EXAMPLE 10

1-methyl-5-(N-methylpiperazinoacetyl)-2,1-benzisothiazoline-2,2-dioxide

To a stirred solution of N-methylpiperazine (4.4 g., 0.044 mole) in 100 ml. of tetrahydrofuran was added 6 g. (0.02 mole) of the bromoketone of Example 7 over a 45-minute period. The resulting mixture is stirred for 1 hour, then evaporated to dryness. Acetone is added to the residue, the insoluble solid filtered, and the filtrate evaporated. The residual oil is taken up in chloroform (75 ml.) which was washed several times with an equal volume of water, dried ($Na_2SO_4$, $K_2CO_3$) and evaporated. The remaining oil readily solidifies when cooled under petroleum ether, recrystallization from benzene affords 1-methyl-5-(N-methylpiperazinoacetyl) - 2,1 - benzisothiazoline-2,2-dioxide in the form of a tan powder, M.P. 140–143°.

*Analysis.*—Calcd. for $C_{15}H_{21}N_3O_3S$ (percent): C, 55.70; H, 6.54; N, 12.99; S, 9.92. Found (percent): C, 55.79; H, 6.62; N, 12.93; S, 9.93.

EXAMPLE 11

1-methyl-5-(2'-N-methylpiperazino-1'-hydroxyethyl)-2,1-benzisothiazoline-2,2-dioxide dihydrochloride To a cooled solution of the aminoketone of Example 10 (1.6 g., 0.005 mole) in 25 ml. of methanol is added 0.19 g. (0.005 mole) of sodium borohydride over a 5-minute period. The solution is stirred at room temperature for 1.5 hours, acidified with 4 N HCl, and evaporated to dryness. The residual gum is covered with ether and treated with 5% NaOH, then the aqueous phase is separated and washed again with ether. The combined ether solutions are dried and treated with ethereal HCl to give a gummy yellow solid. Recrystallization from aqueous methanol-ether provides 1-methyl - 5 - (2'-N-methylpiperazino - 1' - hydroxyethyl)-2,1-benzisothiazoline-2,2-dioxide dihydrochloride in the form of a pale yellow powder, M.P. 212–213°.

*Analysis.*—Calcd for $C_{15}H_{12}N_2O_2S \cdot 2HCl$ (percent): C, 45.23; H, 6.33; N, 10.35. Found (percent): C, 45.52; H, 6.19; N, 10.45.

EXAMPLE 12

1-methyl-5-(methylbenzylaminoacetyl)2,1-benzisothiathiazoline-2,2-dioxide hydrochloride The bromoketone of Example 7 (6 g., 0.02 mole) and 5.4 g. (0.044 mole) of N-methyl-benzylamine in 80 ml. of tetrahydrofuran are allowed to react for 30 minutes as described in Example 10. An identical work-up procedure gives an oil which is dissolved in chloroform and extracted with 5% aqueous HCl. The acidic solution is made alkaline and extracted with ether, which is dried and evaporated. The remaining light amber oil in acetone is treated with ethanolic HCl and then with ether to give the 1-methyl-5 - (methylbenzylaminoacetyl) - 2,1 - benzisothiazoline-2,2-dioxide hydrochloride as a tan powder, M.P. 120–123°, after two recrystallizations from ethanol-ether.

*Analysis.*—Calcd. for $C_{18}H_{20}N_2O_3S \cdot HCl$ (percent): C, 56.76; H, 5.56; N, 7.35. Found (percent): C, 56.42; H, 5.44; N, 7.17.

EXAMPLE 13

1-methyl-5-(2'-methylbenzylamino-1'-hydroxyethyl)-2,1-benzisothiazoline-2,2-dioxide The aminoketone of Example 12 (6.3 g., 0.018 mole), as the free base, is allowed to react with 1.4 g. (0.036 mole) of sodium borohydride in 75 ml. of methanol as described in Example 9. The dried ether solution is evaporated to dryness, and the solid residue is recrystallized from benzene-petroleum ether to yield 1-methyl-5-(2'-methylbenzylamino - 1' - hydroxyethyl)-2,1-benzisothiazoline-2,2-dioxide in the form of pale yellow crystals, M.P. 113–115.5°.

*Analysis.*—Calcd. for $C_{19}H_{22}N_2O_3S$ (percent): C, 62.39; H, 6.40; N, 8.09. Found (percent): C, 62.83; H, 6.43; N, 7.47.

EXAMPLE 14

1-methyl-5-methylaminoacetyl-2,1-benzisothiazoline-2,2-dioxide hydrobromide monohydrate The bromoketone of Example 7 (9.1 g., 0.03 mole) and 2.8 g. (0.09 mole) of methylamine in 100 ml. of tetrahydrofuran are allowed to react for 30 minutes as described in Example 8. Solvent evaporation, followed by the addition of acetone (200 ml.) affords a solid which is recrystallized from aqueous methanol-ether to afford 1-methyl-5-methylaminoacetyl-2,1 - benzisothiazoline - 2,2-dioxide hydrobromide monohydrate in the form of a straw-colored powder, M.P. 235–236°.

*Analysis.*—Calcd. for $C_{11}H_{17}BrN_2O_4S$ (percent): C, 37.40; H, 4.85; N, 7.93; S, 9.08. Found (percent): C, 37.81; H, 4.82; N, 7.94; S, 9.03.

EXAMPLE 15

1-methyl-5-(2'-methylamino-1'-hydroxyethyl)-2,1-benzisothiazoline-2,2-dioxide

The aminoketone salt of Example 14 (4.4 g., 0.013 mole) is allowed to react with 0.49 g. (0.013 mole) of sodium borohydride in 60 ml. of methanol as described in Example 9. After acidification and solvent evaporation, the semi-solid residue is treated with 60 ml. of 7% NaOH. The mixture is stirred for 2 hours, and the resulting solid filtered and dried to yield 1-methyl-5-(2'-methylamino-1'-hydroxyethyl) - 2,1 - benzisothiazoline-2,2-dioxide as a cream-colored powder, M.P. 125–127°. Recrystallization from chloroform-petroleum ether raises the M.P. to 126–128°.

*Analysis.*—Calcd. for $C_{11}H_{16}N_2O_3S$ (percent): C, 51.55; H, 6.29; S, 12.51. Found (percent): C, 50.97; H, 6.51; S, 12.24.

EXAMPLE 16

1-methyl-5-(1-hydroxyethyl)-2,1-benzisothiazoline-2,2-dioxide

To a cooled and stirred suspension of 1-methyl-5-acetyl-2,1-benzisothiazoline-2,2-dioxide (6.75 g., 0.003 mole) in 100 ml. of MeOH is added 1.13 g. (0.03 mole) of sodium borohydride over a 30 min. period. After stirring at room temperature for 16 hrs., the resulting solution is cooled, acidified with 2 N $H_2SO_4$, and evaporated to dryness. Water is added to the residue, which then is extracted with three 40 ml. portions of chloroform. This solution is washed with saturated brine, dried, and evaporated to give an amber-yellow oil. Elution of this material with ether-chloroform (6:1) from 200 g. of silica provides 1-methyl - 5 - (1-hydroxyethyl)2,1-benzisothiazoline-2,2-dioxide as a solid, which is recrystallized from benzene-petroleum ether as a white, crystalline powder, M.P. 83–84°.

*Analysis.*—Calcd. for $C_{10}H_{13}NO_3S$ (percent): C, 52.84; H, 5.77; N, 6.16. Found (percent): C, 53.27; H, 5.91; N, 6.27.

EXAMPLE 17

1-methyl-5-benzylaminoacetyl-2,1-benzisothiazoline-2,2-dioxide hydrobromide

To a stirred solution of benzylamine (8.6 g., 0.08 mole) in 200 ml. of tetrahydrofuran under nitrogen is added 12.2 g. (0.04 mole) of the bromoketone of Example 7 over a 30 min. period. After an additional hour of stirring, the solvent is removed under vacuum and replaced by 300 ml. of acetone. The insoluble material is filtered and dried to give 1 - methyl - 5-benzylaminoacetyl-2,1-benzisothiazoline-2,2-dioxide hydrobromide in the form of a very pale yellow powder, M.P. >360°.

*Analysis.*—Calcd. for $C_{17}H_{19}BrN_2O_3S$ (percent):: C, 49.64; H, 4.66; N, 6.81. Found (percent): C, 50.19; H, 4.76; N, 6.68.

EXAMPLE 18

1-methyl-5-(2-benzylamino-1-hydroxyethyl)-2,1-benzisothiazoline-2,2-dioxide

To a cooled suspension of the aminoketone salt (4.94 g., 0.012 mole) in 75 ml. of MeOH is added 1.36 g. (0.036 mole) of sodium borohydride over a 30-min. period. The mixture is stirred at room temperature for 18 hours and then refluxed for 2 hours. After acidification with 4 N HCl, the solvent is evaporated to near dryness and the residue is stirred with chloroform (60 ml.) and 5% aqueous NaOH (40 ml.) for 2 hours. The separated aqueous layer is washed with additional chloroform, which is combined with the initial chloroform solution, washed with saturated brine, dried ($K_2CO_3$) and evaporated. Recrystallization of the residual solid from chloroform-petroleum ether provides 1-methyl-5-(2-benzylamino-1-hydroxyethyl)-2,1-benzisothiazoline - 2,2 - dioxide in the form of a cream-colored powder, M.P. 127–129°.

*Analysis.*—Calcd. for $C_{17}H_{20}N_2O_3S$ (percent): C, 61.42; H, 6.06; N, 8.43. Found (percent): C, 60.76; H, 6.01; N, 8.18.

EXAMPLE 19

1-methyl-5-(4'-methoxybenzyl)aminoacetyl-2,1-benzisothiazoline-2,2-dioxide hydrobromide A mixture of 13.7 g. (0.1 mole) p-methoxybenzylamine and 15.2 g. (0.05 mole) of the bromoketone of Example 7 is reacted as described in Example 17 to yield 1-methyl-5-(4' - methoxybenzyl)aminoacetyl-2,1-benzisothiazoline-2,2-dioxide hydrobromide in the form of a white powder, M.P. >360°.

*Analysis.*—Calcd. for $C_{18}H_{21}BrN_2O_4S$ (percent): C, 48.98; H, 4.80; N, 6.35. Found (percent): C, 48.88; H, 4.84; N, 6.39.

EXAMPLE 20

1-methyl-5-[2-(4'-methoxybenzyl)amino-1-hydroxyethyl]-2,1-benzisothiazoline-2,2-dioxide A cooled suspension of 5 g. (0.113 mole) of 1-methyl-5-(4'-methoxybenzyl)aminoacetyl - 2,1 - benzisothiazoline-2,2-dioxide hydrobromide is reacted with sodium borohydride as described in Example 18 to yield 1-methyl-5-[2-(4' - methoxybenzyl)amino-1-hydroxyethyl]-2,1-benzisothiazoline-2,2-dioxide in the form of a white powder, M.P. 108–109.5°.

*Analysis.*—Calcd. for $C_{18}H_{22}N_2O_4S$ (percent): C, 59.64; H, 6.12; N, 7.73. Found (percent): C, 59.95; H, 6.22; N, 7.70.

EXAMPLE 21

1-methyl-5-[2-(4'-methoxybenzyl)methylamino-1-hydroxyethyl]-2,1-benzisothiazoline-2,2-dioxide A solution of the amino alcohol of Example 20 (3.6 g., 0.01 mole) in 5 ml. of 98% formic acid and 10 ml. of 37% formaldehyde is heated on a steam bath for 4 hours, cooled, diluted with water (75 ml.), washed with ether (30 ml.), and made alkaline with 10% aqueous NaOH. The resulting oil solidifies with stirring and cooling. The mixture is filtered and dried to yield 1-methyl-5-[2-(4'-methoxybenzyl)methylamino - 1 - hydroxyethyl]-2,1-benzisothiazoline-2,2-dioxide, M.P. 123–125°. Recrystallization from chloroform-petroleum ether affords the compound in the form of fine, white needles, M.P. 125–126.5°.

*Analysis.*—Calcd. for $C_{19}H_{24}N_2O_4S$ (percent): C, 60.61; H, 6.43; N, 7.44. Found (percent): C, 60.46; H, 6.42; N, 7.46.

EXAMPLE 22

1-methyl-5-phenethylaminoacetyl-2,1-benzisothiazoline-2,2-dioxide hydrobromide

A mixture of phenethylamine (2.4 g., 0.02 mole) and 1-methyl-5-bromoacetyl - 2,1 - benzisothiazoline-2,2-dioxide (3 g., 0.01 mole) in 30 ml. of tetrahydrofuran is stirred at 25° for 1 hour, then evaporated to near dryness. Acetone (100 ml.) is added, and the insoluble salt filtered and dried to yield 1-methyl-5-phenethylaminoacetyl-2,1-benzisothiazoline-2,2-dioxide hydrobromide in the form of a cream-colored powder, M.P. >360° with appreciable darkening from 240°. Recrystallization from water affords stout, dull yellow needles, M.P. >360°.

*Analysis.*—Calcd. for $C_{18}H_{21}BrN_2O_3$ (percent): C, 50.85; H, 4.98; N, 6.59. Found (percent): C, 50.94; H, 4.98; N, 6.67.

EXAMPLE 23

1-methyl-5-(2-phenethylamino-1-hydroxyethyl)-2,1-benzisothiazoline-2,2-dioxide

The reaction of the compound of Example 22 (9.8 g., 0.023 mole) and sodium borohydride (3 g., 0.08 mole) in 125 ml. of methanol is carried out at room temperature for 40 hours, then at reflux for an additional 2 hours, in the manner described in Example 18 to yield 1-methyl-5-(2-phenethylamino - 1 - hydroxyethyl) - 2,1 - benzisothiazoline-2,2-dioxide in the form of cream-colored, crystalline powder, M.P. 110–112°.

*Analysis.*—Calcd. for $C_{18}H_{22}N_2O_3S$ (percent): C, 62.40; H, 6.40; N, 8.09. Found (percent): C, 62.13; H, 6.27; N, 8.22.

EXAMPLE 24

1-methyl-5-(2-methylphenethylamino-1-hydroxyethyl)-2,1-benzisothiazoline-2,2-dioxide hexamate A solution of 1-methyl-5-(2-phenethylamino-1-hydroxyethyl)-2,1-benzisothiazoline - 2,2 - dioxide (5.2 g., 0.015 mole) in formaldehyde-formic acid is allowed to react in the manner described in Example 21. The crude product then is converted to 1-methyl-5-(2-methylphenethylamino-1 - hydroxy)-2,1-benzisothiazoline-2,2-dioxide hexamate, M.P. 77–79° after recrystallization from ethanol-ether.

*Analysis.*—Calcd. for $C_{25}H_{37}N_3O_6S_2$ (percent): C, 55.63; H, 6.91; N, 7.78. Found (percent): C, 55.92; H, 7.19; N, 7.57.

EXAMPLE 25

1-methyl-5-[2-N-benzyl-N - (β - hydroxyethyl)-amino-1-hydroxyethyl]-2,1-benzisothiazoline-2,2-dioxide hexamate To a stirred solution of 13.3 g. (0.04 mole) of 1-methyl-5-(2-benzylamino-1-hydroxyethyl) - 2,1-benzisothiazoline-2,2-dioxide in 80 ml. of methanol containing a drop of dilute HCl is added 2.1 g. (0.048 mole) of ethylene oxide in 40 ml. of methanol. The resulting solution is stirred for 24 hours at room temperature, then treated with a small amount of 6 N NaOH, and evaporated to dryness. The remaining amber oil is eluted from 650 g. of alumina with chloroform-methanol (9:1) to afford 1-methyl-5-[2-N-benzyl-N-(β-hydroxyethyl)-amino-1-hydroxyethyl] - 2,1 - benzisothiazoline-2,2-dioxide as a pale yellow oil. Treatment with an equivalent amount of hexamic acid affords the salt as pale yellow crystals, M.P. 145–148°.

*Analysis.*—Calcd. for $C_{25}H_{33}N_3O_7S_2$ (percent): C, 54.03; H, 6.71; N, 7.56. Found (percent): C, 53.78; H, 6.68; N, 7.64.

EXAMPLE 26

1-methyl-5-(2-benzylaminoethyl)-2,1-benzisothiazoline-2,2-dioxide hydrochloride

To a cooled and stirred solution of 1-methyl-5-(2-benzylamino-1-hydroxyethyl)-2,1 - benzisothiazoline-2,2-dioxide (4.65 g., 0.014 mole) and 3.8 g. (0.1 mole) of sodium borohydride in 75 ml. of tetrahydrofuran is added under nitrogen a solution of boron trifluoride etherate (34 ml.) in 40 ml. of tetrahydrofuran over a 30 min. period. The resulting mixture is stirred at room temperature for 1.5 hours and evaporated to dryness. Methanol (150 ml.) is added carefully to the residue, and the solution refluxed for 2 hours, stirred at room temperature for an additional 12 hours and then evaporated. Water (100 ml.) is added to the residue, and the insoluble material filtered and dried. The small, pale tan flakes are heated at reflux in a solution of MeOH (200 ml.)-4 N HCl (25 ml.) for 12 hours. Cooling and dilution with ether provides 1-methyl-5-(2-benzylaminoethyl)-2,1-benzisothiazoline-2,2-dioxide hydrochloride in the form of white needles, M.P. 246–247°. Recrystallization from aqueous methanol-ether raises the M.P. to 249–250°.

*Analysis.*—Calcd. for $C_{17}H_{21}ClN_2O_2S$ (percent): C, 57.86; H, 6.00; N, 7.94. Found (percent): C, 57.75; H, 6.14; N, 7.88.

EXAMPLE 27

1-methyl-5-(2-methylbenzylaminoethyl)-2,1-benzisothiazoline-2,2-dioxide hydrochloride Treatment of 4.4 g. of the hydrochloride of Example 26 with chloroform-aqueous sodium hydroxide provided the corresponding free base, which is heated with 20 ml. of 37% formaldehyde solution and 10 ml. of formic acid on a steam bath for 4 hours. The work-up procedure previously described affords a pale yellow oil with an absence of NH absorption in the infrared. Conversion of this material to a hydrochloride, followed by recrystallization from ethanol-ether, gives 1-methyl-5-(2-methylbenzylaminoethyl) - 2,1 - benzisothiazoline-2,2-dioxide hydrochloride as white granules, M.P. 176–178°.

*Analysis.*—Calcd. for $C_{18}H_{23}ClN_2O_2S$ (percent): C, 58.92; H, 6.32; N, 7.63. Found (percent): C, 59.18; H, 6.68; N, 7.60.

EXAMPLE 28

1-methyl-5-methylphenethylaminoacetyl-2,1-benzisothiazoline-2,2-dioxide hydrochloride N-methylphenethylamine (2.7 g., 0.02 mole) and 1-methyl-5-bromoacetyl-2,1 - benzisothiazoline-2,2-dioxide (3 g., 0.01 mole) are allowed to react in 30 ml. of tetrahydrofuran in the usual fashion. Chromatography on crude product (3.4 g.) on alumina with benzene-ether (1:1) affords a yellow oil, which was treated with ethereal HCl to give 1.9 g. of a cream-colored powder, M.P. 90–100° with prior softening. Recrystallization of a 0.7 g. sample from ethanol-ether gives 1-methyl-5-methylphenethylaminoacetyl - 2,1-benzisothiazoline-2,2-dioxide hydrochloride in the form of a pale yellow powder, M.P. 126–127°.

*Analysis.*—Calcd. for $C_{19}H_{23}ClN_2O_3S$ (percent): C, 57.78; H, 5.87; N, 7.09. Found (percent): C, 58.07; H, 5.85; N, 7.17.

We claim:
1. A compound of the formula

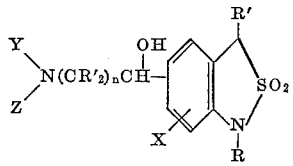

in which X is hydrogen, alkyl of 1 to 4 carbons atoms, alkoxy of 1 to 3 carbon atoms, halo and trifluoromethyl; R is alkyl of 1 to 4 carbon atoms; R' is hydrogen or alkyl of 1 to 4 carbon atoms, $n$ is 1 to 5 and Y and Z are selected from hydrogen, alkyl of 1 to 4 carbon atoms and phenyl-alkyl in which the alkyl group is 1 to 4 carbon atoms, and pharmaceutically acceptable salts thereof.

2. A compound of claim 1 in which X is hydrogen, R is methyl, R' is hydrogen and Y and Z are hydrogen, methyl, ethyl, isopropyl, benzyl or phenethyl.

3. A compound of claim 1 in which X is hydrogen, R is methyl, R' is hydrogen, $n$ is 1 and Y and Z are lower alkyl.

4. A compound of claim 1 in which X is hydrogen, R is methyl, R' is hydrogen, $n$ is 1, Y is methyl and Z is benzyl.

5. A compound of claim 1 in which X is hydrogen, R is methyl, R' is hydrogen, n is 1, Y is methyl and Z is hydrogen.

6. A compound of claim 1 in which X is hydrogen, R is methyl, R' is hydrogen, n is 1, Y is hydrogen and Z is benzyl.

7. A compound of claim 1 in which X is hydrogen, R is methyl, R' is hydrogen, n is 1, Y is hydrogen and Z is phenethyl.

8. A compound of claim 1 in which X is hydrogen, R is methyl, R' is hydrogen, n is 1, Y is hydrogen and Z is isopropyl.

No references cited.

JAMES H. TURNIPSEED, Assistant Examiner

U.S. Cl. X.R.

260—247.1, 268, 288, 293.4; 252—380; 424—248, 250, 258, 263, 267, 275

UNITED STATES PATENT OFFICE
CERTIFICATE OF CORRECTION

Patent No. 3,539,584   Dated November 10, 1970

Inventor(s) John T. Suh, Claude I. Judd & Joseph A. Skorcz

It is certified that error appears in the above-identified patent and that said Letters Patent are hereby corrected as shown below:

Column 2, lines 55-58 - " base + insert " should read

-- base + inert --.

Column 3, lines 50-55, that portion of the formula reading

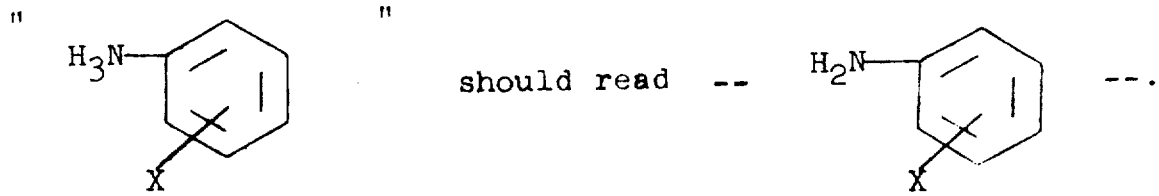

Column 4, line 35 - "methanesulfonamide" should read

-- methanesulfonamido --.

Column 7, line 28 - "1,methyl" should read -- 1-methyl --.

Column 10, line 49 - "thiathiazoline" should read

-- thiazoline --.

Column 11, line 3 - "$C_{19}H_{22}N_2O_3S$" should read -- $C_{18}H_{22}N_2O_3S$ -

Column 11, line 44 - "0.003 mole)" should read -- 0.03 mole) -

Column 13, line 9 - "$C_{18}H_{21}BrN_2O_3$" should read -- $C_{18}H_{21}BrN_2O_3$ Column 13, line 36 - "1-hydroxy)" should read -- 1-hydroxyethyl) --.

Signed and sealed this 16th day of March 1971.

(SEAL)
Attest:

EDWARD M. FLETCHER, JR.
Attesting Officer

WILLIAM E. SCHUYLER, JR
Commissioner of Patents